United States Patent
Kay et al.

(10) Patent No.: US 8,386,604 B1
(45) Date of Patent: Feb. 26, 2013

(54) ASSIGNING BLAME TO WEB BROWSER EXTENSIONS AND APPLICATIONS

(75) Inventors: Erik Kay, Belmont, CA (US); Matthew Perry, San Francisco, CA (US); Jochen Eisinger, Munich (DE)

(73) Assignee: Google Inc., Mountain View, CA (US)

( * ) Notice: Subject to any disclaimer, the term of this patent is extended or adjusted under 35 U.S.C. 154(b) by 2 days.

(21) Appl. No.: 13/251,033

(22) Filed: Sep. 30, 2011

(51) Int. Cl.
*G06F 15/173* (2006.01)
*G06F 15/16* (2006.01)

(52) U.S. Cl. ........................................ 709/224; 709/202

(58) Field of Classification Search .................. 709/223, 709/224, 202
See application file for complete search history.

(56) References Cited

U.S. PATENT DOCUMENTS

| | | | | |
|---|---|---|---|---|
| 6,591,298 | B1 * | 7/2003 | Spicer et al. | 709/224 |
| 6,857,119 | B1 * | 2/2005 | Desai | 717/145 |
| 7,216,160 | B2 * | 5/2007 | Chintalapati et al. | 709/224 |
| 7,353,272 | B2 * | 4/2008 | Robertson et al. | 709/224 |
| 7,373,376 | B1 * | 5/2008 | Hamer et al. | 709/203 |
| 7,657,451 | B2 * | 2/2010 | Dubois et al. | 705/7.41 |
| 7,720,959 | B2 * | 5/2010 | Karam et al. | 709/224 |
| 8,024,453 | B2 * | 9/2011 | Ahmed et al. | 709/224 |
| 8,032,317 | B2 * | 10/2011 | Houston et al. | 702/62 |
| 8,271,829 | B2 * | 9/2012 | Tai | 714/4.1 |
| 2002/0152305 | A1 * | 10/2002 | Jackson et al. | 709/224 |
| 2003/0063723 | A1 * | 4/2003 | Booth et al. | 379/106.03 |
| 2003/0161321 | A1 * | 8/2003 | Karam et al. | 370/395.21 |
| 2004/0215762 | A1 * | 10/2004 | Oulu et al. | 709/223 |
| 2005/0262104 | A1 * | 11/2005 | Robertson et al. | 707/10 |
| 2007/0208843 | A1 * | 9/2007 | Wexler et al. | 709/223 |
| 2012/0023487 | A1 * | 1/2012 | Letca et al. | 717/130 |
| 2012/0069382 | A1 * | 3/2012 | Osada | 358/1.14 |

OTHER PUBLICATIONS

Mozilla, "Slow Performing Add-ons," https://addons.mozilla.org/en-US/firefox/perforrnance/ , downloaded Sep. 29, 2011, pp. 1-5.
Microsoft, "Add-on Performance Advisor," http://windows.microsoft.com/en-US/internet-explorer/products/ie-9/features/add-on-performance-advisor, downloaded Sep. 29, 2011, 1 page.

* cited by examiner

*Primary Examiner* — Kristie Shingles
(74) *Attorney, Agent, or Firm* — Brake Highes Bellerman LLP

(57) ABSTRACT

According to one general aspect, a method of assigning blame to web browser extensions and applications is described. The method gathers performance data about a web application, detects a problem with the web application based on the performance data, and displays, when the problem is detected, an indication of the problem adjacent an indicator representing the web application.

20 Claims, 7 Drawing Sheets

ASSIGNING BLAME TO WEB BROWSER EXTENSIONS AND APPLICATIONS

TECHNICAL FIELD

This disclosure generally relates to assigning blame to software applications, and in particular to assigning blame to web browser applications and web browser extensions.

BACKGROUND

Often, a web browser may slow down or offer poor performance after a number of web applications or web browser extensions have been installed. When many extensions are installed or operating in a web browser, it may be difficult to determine which extension is to blame for the web browser's poor performance. The browser's poor performance could be due to a problem with a single extension, the cumulative effect of many extensions, or something unrelated to the extensions, such as a proxy server or Wi-Fi connection problem. Therefore, there exists a need for developers and users to measure, understand, and compare the performance of web browser extensions and web applications.

SUMMARY

According to one general aspect, a computer-implemented method for assigning blame to web applications includes gathering performance data about a web application from multiple clients, wherein the performance data is based on multiple performance factors. The method includes detecting a problem with the web application based on the performance data, and displaying, when the problem is detected, an indication of the problem adjacent an indicator representing the web application.

According to another general aspect, a computer-implemented method for determining computer performance problems includes determining a performance issue with a first web application while multiple web applications are executing on a web browser, wherein the performance issue is determined based on multiple performance factors, and upon determining the performance issue, displaying an indicator representing the performance issue.

According to yet another general aspect, a tangible computer-readable storage medium including recorded and stored instructions is described. The instructions, when executed by a processor of a computer system, may cause the computer system to gather performance data about a web application, wherein the performance data is based on multiple performance factors. Further, the instructions may cause the computer to detect a problem with the web application based on the performance data and display, when the problem is detected, an indication of the problem adjacent an indicator representing the web application.

According to yet another general aspect, a system may include a memory configured to store executable code, and a processor operably coupled to the memory. The processor may be arranged and configured to execute the code to gather performance data about a web application, wherein the performance data is based on multiple performance factors. The processor may be arranged and configured to execute the code to detect a problem with the web application based on the performance data, and to display, when the problem is detected, an indication of the problem adjacent an indicator representing the web application.

Implementations can include one or more of the following features. For example, the detected problem may be at least one of a Wi-Fi connection problem, a slow ISP, and a network problem, and wherein the indication represents the detected problem. As another example, the indication of the problem may be displayed in a digital marketplace. The performance data may be gathered from web browsers that previously executed the web application. A performance metric may be applied to assign a blame score to the application, and the indication of the problem may be selected based on the blame score. A request to analyze the web application may be received, for example at a server. The multiple performance factors may include: web browser execution time, memory usage, and battery life.

In other examples, determining a performance issue with a first web application while multiple web applications are executing on the web browser may be based on a database of aggregated web application performance data collected from multiple web browsers. Further, the indicator representing the performance issue may be displayed within one of a toolbar, a menu, and a pop-up window. The indicator may be selected based on an analysis of the multiple performance factors. The performance issue may be reported to clients that have downloaded the web application.

In various implementations, the indicator may include a notification with potential solutions to the problem. The indicator may be displayed in a digital marketplace. The indicator may be selected based on analyzed performance factors, including web browser run times, memory usage of a computing device of the client, and battery life of the computing device. The performance issue may be unrelated to the web application. Analyzed performance factors may be compared with a set of analyzed performance factors for a second web application, and the web application and the second web application may be ranked based on the comparison. Determining the performance issue may include analyzing information provided by the client.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
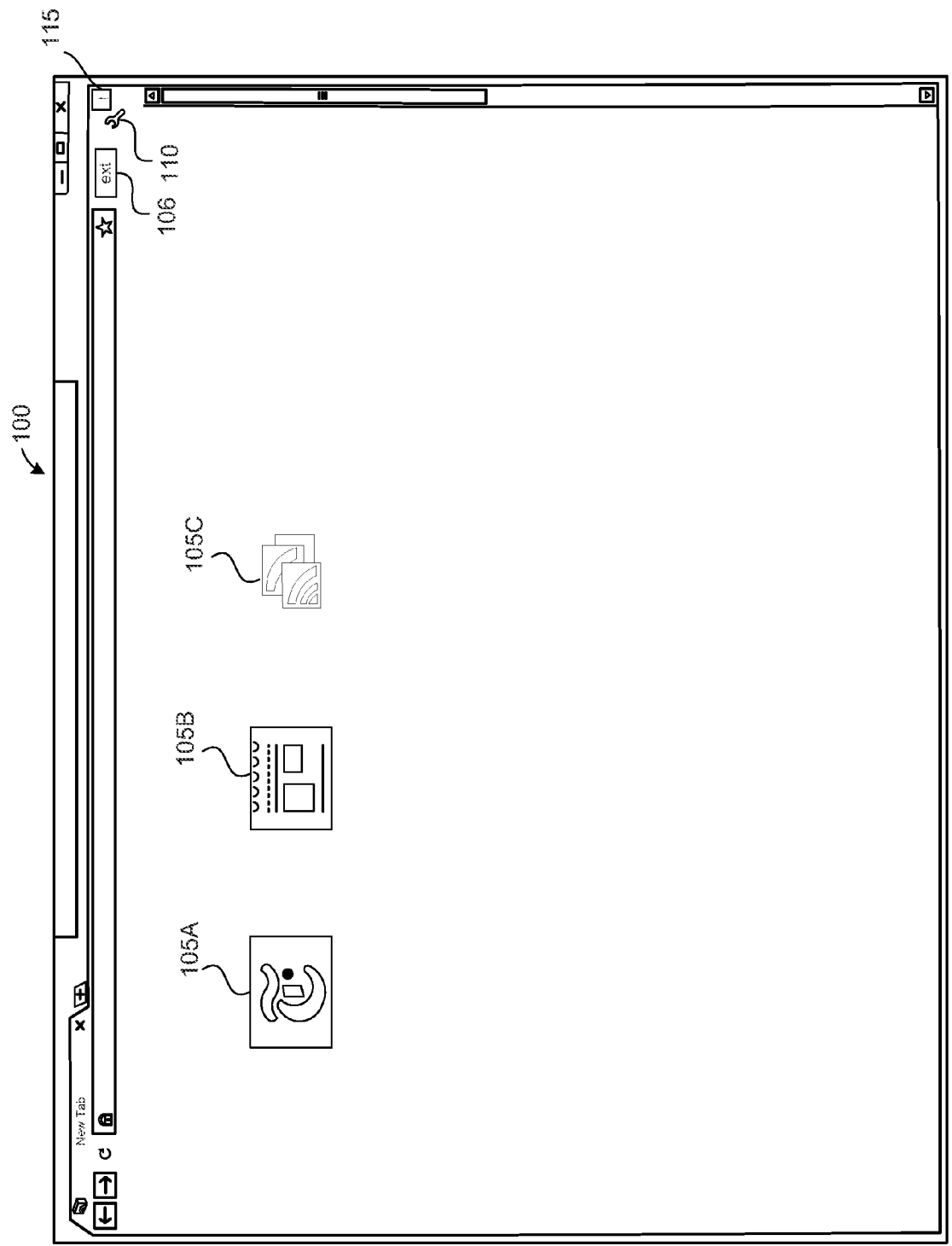
FIG. 1 illustrates an exemplary, user interface consistent with embodiments of this disclosure.

A web browser executed by a client device can receive code (e.g., HTML code) from a remote server (e.g., a remote server that hosts a website) and can execute the receive code on the client device for the benefit of a user of the client device.

In various embodiments, the web browser may include or be associated with one or more web applications. In this context, a "web application" may be configured to a single task or multiple tasks for a user. In such an embodiment, the web application may be configured to be executed or interpreted by the web browser. This is compared with the native applications that include machine executable code and are configured to be executed directly by a processor or via the operating system of the client device, whereas, a web application may be incapable of execution or display without the aid of the web browser. Thus, web applications can be run inside a browser with a dedicated user interface, and typically provide functionality and an experience that is more rich and interactive than a standalone website but are less cumbersome and monolithic than a desktop application. Examples of web applications include games, photo editors, and video players that are run inside the browser.

Web applications can be "hosted applications" or "packaged applications." Hosted applications may include at least a portion of a web site that itself includes web pages, plus some metadata that may be especially pertinent to the web application or to the user of the web application to allow the web application to perform some particular functionality for the user. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Packaged web applications have the option of using Extension APIs, allowing packaged applications to change the way the browser behaves or looks.

In various embodiments, the web browser may include or be configured to interact with one or more browser extensions. In this context, a "browser extension" may include one or more web pages packaged or grouped together as a definable whole, and configured to extend the functionality to the web browser. Thus, extensions also provide extra functionality to a browser, but generally, unlike applications, there is little or no user interface component to the functionality provided by an extension. Instead, web extensions extend the functionality of the browser and the websites being viewed in it. For example, web extensions can extend the functionality of the browser by adding a new button to the address bar, such as an ever-present currency converter. Buttons like this can also apply to the current website being viewed for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, and extension may be installed to embed a "mail this" button next to every link in every page. Compared to web applications, extensions cut across websites and web applications. Extensions are usually in effect across all websites (though some are site-specific). Web applications do not combine with other applications in this way. Rather, web applications run standalone, like any regular website.

Web browser extensions and applications can be downloaded for installation in and execution by a browser running on a client computing device. Web browser extensions and applications may affect how a browser performs. When multiple extensions or applications are in use, a user may have a difficult time determining which extension or application is to blame for poor browser performance. Systems and methods consistent with certain embodiments assist with measuring performance issues and making users aware of which web extensions or applications to blame for the performance issues. Data about performance issues may be gathered from individual users, stored at a server, and analyzed for individual users, or for groups of users.

FIG. 1 illustrates an exemplary user interface 100 consistent with embodiments described in this disclosure. User interface 100 may be displayed by a browser application that is executed by a computing device that may be connected to a network (e.g., the Internet). The browser application may open one or more tabs 104, one of which may display user interface 100 to a digital marketplace, for example. When a user navigates to a webpage identified by a uniform resource locator (URL) that provides content to the browser application, the browser application may display user interface 100 as the digital marketplace in the tab.

User interface 100 may include indicators 105A, 105B, and 105C representing web browser applications (e.g., software applications that may be executed in a browser-controlled environment). User interface 100 may also include one or more indicators 106 representing web browser extensions e.g., software extensions for web browsers). User interface may also include a customization indicator 110. Customization indicator 110 may be used to display menus, notifications, or other information related to the browser. User interface 100 may also include a problem indicator 115, which may be displayed adjacent to customization indicator 110, as shown. One skilled in the art will recognize that problem indicator 115 may be displayed in various ways anywhere within or near user interface 100, such as in a pop-up window. The location and depiction of problem indicator 115, as shown in FIG. 1, is merely one illustrative example to which the disclosed subject matter is not limited.

Problem indicator 115 may be displayed when a browser encounters a performance issue. Examples of performance issues include: when a browser runs slowly, when a browser is unstable, when a browser crashes, when overall memory usage of a computing device is high, when a battery life of a computing device is being depleted quickly, when a combination of multiple performance factors occur, etc. In some embodiments, problem indicator 115 may flash, change colors, or be accompanied by a sound, animation, or other feature to notify a user of a performance issue. In certain embodiments, a client may analyze its own performance and indicate when a web application or browser extension experiences a problem, without communicating with a server. Alternatively or additionally, a client may communicate with a server to determine or analyze a performance issue.

Figure 2:
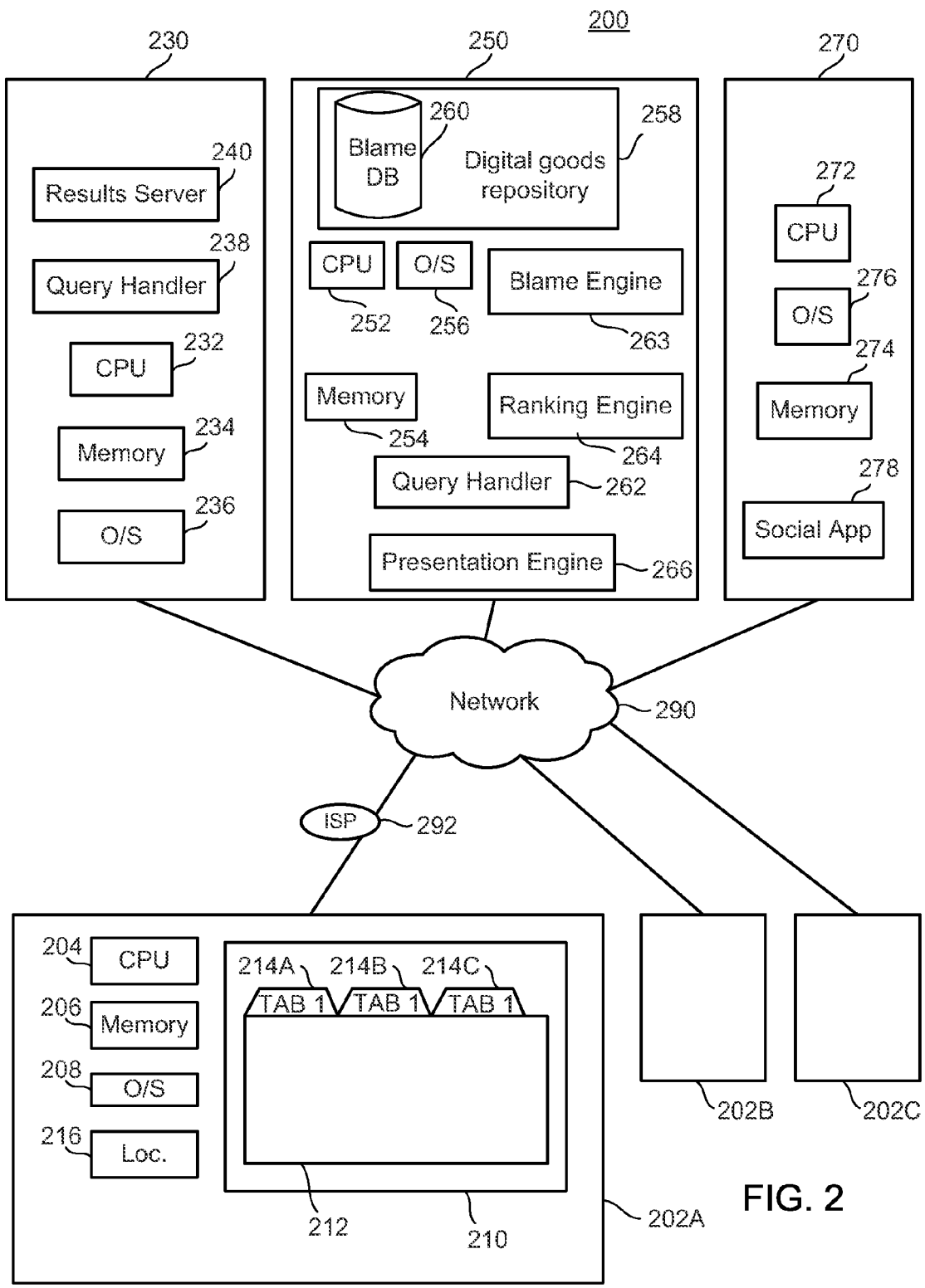
FIG. 2 is a schematic diagram of a system for assigning blame to web applications and web extensions.

FIG. 2 is a schematic block diagram of an example embodiment of a system 200 for assigning blame to web browser applications and web browser extensions. In various embodiments, system 200 may include client computing devices (e.g., desktop computers, notebook computers, netbook computers, tablet computers, smart-phones, etc.) 202A, 202B, and 202C. A client computing device 202A may include one or more processors 204 and one or more memories 206. The client computing device 202A may execute an operating system 208 and an application 210, which may display a user interface window 212. The client computing device 202A may include a location detector 216, which may automatically detect a location of the computing device, for example, based on global positioning system (GPS) signals, or by triangulation of signals from transmitters at known locations, or by using other hardware or techniques.

In one embodiment, client computing device 202A may be running or causing the operating system 208 to execute an application 210 or window 212. For purposes of illustration, window 212 is referred to as a web browser. However, it is understood that the above is merely one illustrative example to which the disclosed subject matter is not limited. In various embodiments, window 212 may include a plurality of panes or tabs 214A, 214B, 214C. Window 212 may be a visual area containing some kind of user interface. In a graphical user interface (GUI) used in client device 202A, window 212 may be a two-dimensional object arranged on a plane of the GUI known as the desktop. Window 212 may include other graphical objects, e.g., a menu-bar, toolbar(s), controls, icons and a working area in which a document, image, folder contents, or other main object may be displayed. The working area may be capable of holding only one main object (i.e., in a single document interface) or more than one main object in a multiple document interface. In some applications, such as web browsers, multiple documents may be displayed in individual tabs 214A, 214B, 214C. These tabs 214A, 214B, 214C may be displayed one at a time, and may be selectable via a tab-bar which may reside above the contents of an individual window. That is, one selected tab 214A is "forward-facing" and displays information or content to a user in the window 212, while the content of other tabs 214B and 214C is "hidden."

The client computing devices 202A, 202B, and 202C may receive online content from one or more server computing devices 230, 250, 270, that may be connected to the client device 202 through a network 290. Each of the client computing devices 202A, 202B, and 202C may be connected to the network 290 through a local Internet Service Provider 292. The received online content may be processed and displayed in the window 212 (e.g., in tab 214 of window 212). For example, window 212 may display a user interface of a marketplace tor digital goods to a user.

A location of client computing device 202A may be determined based on a location associated with the ISP 292. For example, a known location of ISP 292 may be used as an approximation or as a proxy for the location of the client computing device 202A.

Client computing device 202A may communicate with a digital goods marketplace server 250 that provides a marketplace for digital goods to client computing devices 202A, 202B, 202C. The marketplace server 250 may include one or more processors 252 and one or more memories 254. The marketplace server 250 may execute an operating system and various applications and services to provide functionality to the client computing devices. For example, in one implementation, the marketplace server 250 may include a digital goods repository 258 (e.g., a database or other data store), and the digital goods may be served from, or downloaded from, the repository to the client computing devices. In another implementation, the digital goods and related data may be stored in, and serve to client computing devices from, a repository that is remotely located from the marketplace server. For example, digital goods could be stored and served to client computing devices from individual repositories that are operated and controlled by developers of the digital goods, and digital goods repository 258 of the marketplace server 250 may provide a reference to the individual repositories that are operated by the developers.

Digital goods repository 258 stores metadata associated with the digital goods that are available from or referenced by the digital goods repository 258. The metadata associated with a digital good may include a variety of information about the digital goods including, for example, information about the digital goods that are available from the repository 258. Such information may include, for example, representative keywords associated with the digital goods, and the price associated with the digital goods. The metadata may also include demographic data about targeted users of the digital good, a time of year month or day during which the digital goods may be of the highest interest to a user, etc. For example, metadata associated with a surfing videogame may indicate that the good is intended for use by male users between the ages of 15 and 34, who live in coastal California or Hawaii, and that the game may be more popular during summer months than during winter months.

Marketplace server 250 may also include blame database 260, which may reside in digital goods repository 258 or elsewhere. Blame database 260 may store performance data and blame scores associated with digital goods. The data may include performance data related to download time, start-up time, run time, memory usage, battery life usage, and other performance issues associated with a digital good such as a web browser application or web browser extension. Data from blame database 260 may be used to assign blame to digital goods, such as blame related to performance issues. Blame database 260 may include data gathered automatically by server 250, submitted by developers or users, or acquired in a tab or other environment.

Marketplace server 250 may include query handler 262 that may be configured to receive and process queries related to digital goods available in the marketplace. For example, query handler 262 may receive queries for digital goods via user interface 100. Terms or phrases of the queries then may be compared to terms and phrases (e.g., terms and phrases stored in the metadata database 260, performance data from blame database 260) that are used to index the digital goods available in the marketplace. Based on the comparison, a subset of digital goods may be selected from the database 258 with which to respond to the query. Query handler 262 may also receive queries related to performance issues for specific digital goods via user interface 100.

The marketplace server 250 may also include blame engine 263. Blame engine 263 may be configured to gather, process, and distribute performance information related to digital goods that are available in the marketplace, or that are executed using client 202A, 202B, or 202C. For example, blame engine 263 may receive queries from query handler 262, and blame engine 263 may determine which digital goods are creating performance issues for client 202A, 202B, or 202C. In certain embodiments, blame engine 263 may apply performance metrics using data from blame database 260 to determine results. Blame engine 263 may also determine whether a digital good web application or web extension) is not affecting performance of a web browser, and whether another factor may be affecting performance of the web browser or client 202A, 202B, or 202C, such as a Wi-Fi connection problem, a stow ISP, etc.

The marketplace server 250 may include a ranking engine 264 that is configured to rank digital goods based on signals relevant to the relative desirability of the goods to a user, where at least one of the signals is based on information that is generated outside the marketplace. For example, the goods may be ranked based on results related to performance, such as those generated by blame engine 263.

The marketplace server 250 may include a presentation engine 266 that prepares information for transmission to the client computing devices 202A, 202B, 202C, where the information is used by the client computing devices to display a user interface 100 that shows representations of selected digital goods available in the marketplace. For example, based on the output of the blame engine 263 and the ranking engine 264, the presentation engine 266 may prepare HTML code, XML code, etc. that determines information that is displayed to a user in the user interface 100 and where the code determines which digital goods will be displayed in the user interface 100 to the user.

The ranking engine 264 may use a variety of signals to rank the relative desirability to the user of different digital applications available in the marketplace, where some of the signals may be based on information that is generated outside of the marketplace. In one implementation, the signals used by the ranking engine 264 may be based on how a web application available from the marketplace is used by a client computing device, or how a web application performs when utilized by a client computing device.

In one implementation, data used by blame engine 263 may be based on how a digital good available from the marketplace performs on a client computing device 202A, 202B, 202C, after the digital good is downloaded from the digital goods repository 258 to the client computing device for execution on the client. For example, when a web application is downloaded from the repository 258 and is executed by a browser application 210 running on the client device 202A, the browser application may monitor one or more performance factors each time the web application is launched within the browser. Performance factors may include, for example, how often the browser crashes or experiences delays; how much battery life of client device 202A declines while the web application is running; and how much memory of client device 202A is used while the web application is running. The browser application may report this information to the blame engine 263. Other examples of application performance factors may include: a rate at which a web application available from the marketplace crashes while being loaded or executed by a client computing device 202A, 202B, 202C, an amount of a system resource usage (e.g., processor usage, network bandwidth usage, etc.), or a combination of multiple performance factors. It is understood that the above are merely a few illustrative examples to which the disclosed subject matter is not limited.

The information that is provided by an application 210 running on a client device to the marketplace server 250 (e.g., regarding how a web application is launched, system resource usage, etc.) may be provided on an opt-in basis. In other words, such information may be provided from the client computing device 202A to the server 250 only if the user of the client device specifically authorizes the transmission of such information from the client to the server. Further, in some embodiments, performance related information may be reported to clients that have opted to receive such information, such as to a user who opted to receive performance updates when the user downloaded an application. In addition, data may be anonymized in one or more ways before it is sent, so that personally identifiable information is removed.

Because browser application 210 may communicate easily over network 290, the browser application may provide feedback to blame engine 263 or ranking engine 264 of the marketplace server 250 about the local usage of the web application on the client computing device. By receiving such feedback from many client computing devices 202A, 202B, 202C, blame engine 263 and ranking engine 264 may gather a great deal of information about how an application is actually used and performs after it is downloaded from the marketplace server 250. Thus, blame engine 263 and ranking engine 264 have the ability to analyze, measure, and rank digital goods available from the marketplace server 250 based on signals relevant to the relative desirability of different applications to users, where such signals may include signals based on information about how applications are actually used, or how applications actually perform, after the applications are downloaded from the marketplace server 250 and installed on a client computing device.

Blame engine 263 and ranking engine 264 may provide information in the digital marketplace. Blame engine 263 may also analyze and measure digital goods for specific users, for example based on requests by the users, before, during, or after executing web applications or web extensions. Blame engine 263 may rely on performance testing from a virtualized environment, as well as general performance characteristics. Performance data is not limited to start-up time measurements, and may include a variety of factors related to a web browser application, web browser extension, or client device.

The above-described signals are but a few examples of signals based on information that is generated outside of the marketplace and relevant to the performance of different applications that are available from the marketplace. Other signals also may be used by blame engine 263.

In another implementation, signals based on information that is generated outside of the marketplace and that are used by the blame engine 263 for determining blame of web extensions or web applications may include signals based on information provided by a search engine. For example, in one implementation, such signals may be based on recent trends in query terms received through a search engine.

As shown in FIG. 2, system 200 may include a search engine server 230 that includes one or more processors 232, one or more memories 234, an operating system 236, a query handler 238, and a result server 240. Query handler 238 may receive queries that include one or more query terms or query phrases from client computing devices 202A, 202B, 202C, and a result server 240 may provide search results in response to the queries. Search engine server 230 may monitor the query terms and phrases received from client devices, and based on the query term traffic the search engine server 230 may generate statistics about trends in users' interests.

For example, search queries for "problem with NewsApp" may indicate a specific problem is occurring with a news application called "NewsApp." Such trends in query term traffic may be provided by the search engine server to the marketplace server 250, so that blame engine 263 may utilize the query traffic to determine a frequency of a specific performance issue, and ranking engine 264 of the marketplace server may rank digital goods available in the marketplace based on trends in query traffic. For example, the ranking engine 264 may boost or lower the relative ranking of individual digital goods available in the marketplace will 250 based on search engine traffic. Thus, for example, when search engine traffic reveals that a game or a movie is becoming popular, and such information is provided to the ranking engine 264, the ranking engine may boost the ranking of web applications that are related to the game or the movie. If search engine traffic reveals that a particular problem with a web application related to the game is occurring, ranking engine may lower the ranking of the web applications.

In another implementation, signals based on information that is generated outside of the marketplace and that are used by the ranking engine 264 for ranking the relative desirability of digital goods available marketplace may include signals based on information provided by a social network applications or servers. For example, in one implementation, such signals may be based on how digital goods are used by acquaintances of a particular user, and the rankings performed by the ranking engine 264 may be based on such signals and may be specifically tailored for the particular user.

As shown in FIG. 2, the system 200 may include a social network server 270 that includes one or more processors to 272, one or more memories 274, an operating system 276, and a social network application 278. The social network application 272 may provide a network, environment, virtual world through which a particular user may interact with selected colleagues, friends, acquaintances (collectively, "friends") of the particular user. For example, the particular user may exchange information with his or her friends about interests that they may share. Thus, a user that downloads a digital good from marketplace server 250 and installs and executes the digital good within a client computing device controlled by the user may recommend the web application to the user's friends. Such recommendations pass through social application 278, and anonymous information about such recommendations may be gathered by social network server 270 and then passed on to ranking engine 264. The ranking engine then may base its rankings of digital goods in the marketplace on statistical information about such recommendations. For example, ranking engine 264 may lower the ranking of a web application that has received a large amount of blame for crashing web browsers. In another example, ranking engine 264 may lower a user-specific ranking of a web application when the web application has been blamed frequently for depleting battery life of a smartphone.

Blame engine 263 also may use other signals that are generated outside of the marketplace to generate performance information about digital goods available in the marketplace. In one implementation, blame engine 263 may provide blame statistics specific to a user of digital goods, where the statistics are based in some way on information that is associated with the user and that is generated outside the marketplace. In one implementation, the information associated with the user may include information that the user actively provides or enters (e.g., a number of times a browser application crashed, an amount of time required to run a browser extension, etc.). In one implementation the information associated with a user may include information inferred from user actions (e.g., the user's browsing history, error messages, etc.) or passively gathered about the user (e.g.; the user's location, number of downloads, requests for customer assistance, memory usage, battery life performance, network bandwidth, etc.). Passively gathered information may be collected on an opt-in basis.

In another example, a user may be able to determine he has a problem with an ISP or other service, and not with a particular web extension or web application, based on a blame score of a web application or web extension. For example, if the "NewsApp" web browser application has a low overall blame score, but a user's browser is running slowly, the user may determine that the "NewsApp" web application is not to blame for his browser's slow performance. A user may receive a notification with potential solutions to his problems.

In another implementation, information associated with the user may include a type of client device e.g., smartphone, laptop computer, desktop computer, etc.) used to implement a web browser application or extension. Based on that information, blame engine 263 may provide information about the performance score of digital goods that are individually tailored to the user. For example, blame engine 263 may generate information for a version of an application that executes faster on a desktop, or for an application that causes a smartphone to lose battery power quickly.

The information that is provided by an application 210 running on a client device to the marketplace server 250 (e.g., regarding a user's browsing history, etc.) may be provided on an opt-in basis. In other words, such information may be provided from the client computing device 202A to the server 250 only if the user of the client device specifically authorizes the transmission of such information from the client to the server.

In certain embodiments, a single client (e.g., client 202A) may analyze its own performance and alert a user when a web application or browser extension experiences a problem, without communicating with server 250, as described in more detail below with respect to FIG. 3.

Figure 3:
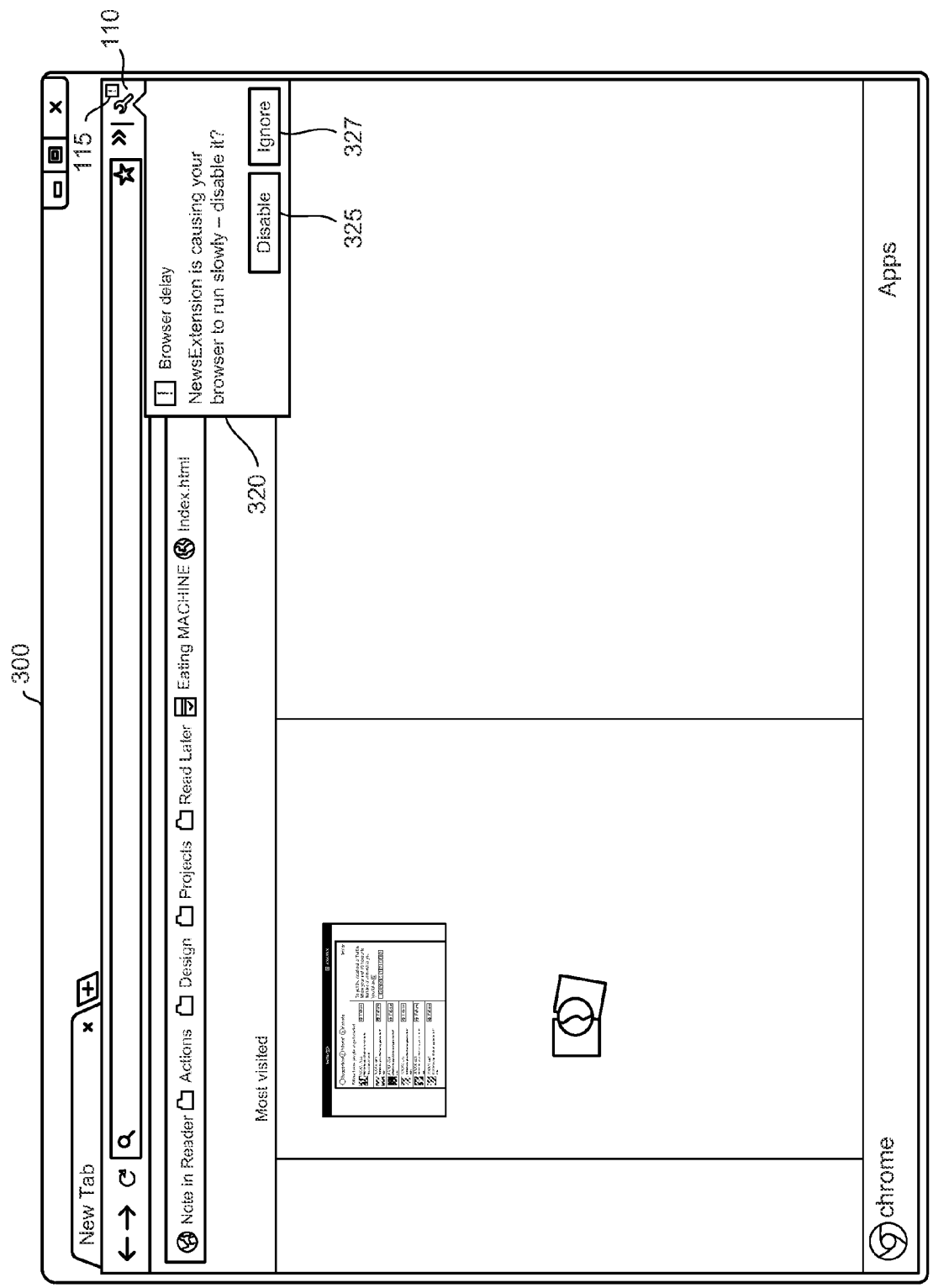
FIG. 3 illustrates a user interface for a web browser.

FIG. 3 illustrates an exemplary user interface 300 for a web browser. User interface 300 may include customization indicator 110 and problem indicator 115. In certain embodiments, problem indicator 115 may only appear, for example, when the browser encounters a performance issue. In other embodiments, problem indicator may appear after a user has selected customization indicator 110. Problem indicator 115 may be used to warn a user after a single client has analyzed its own performance and determined a problem, without communicating with a server, for example. The warning (e.g., problem indicator 115) may appear when a web application or browser extension becomes slow, for example. The warning may be for any number of local reasons particular to the user of a client device, which may be irrelevant to a general user. For example, a web application may cause a conflict with a local printer application installed on a client device, or may use a large amount of memory, or drain a battery of a mobile device. Such performance issues may be specific to a user and may not affect general users. Conversely, the user may ignore the warning if it is not relevant to the user. For example, if the warning indicates that a web application consumes a large amount of central processing unit (CPU) resources, a user may not care.

In the implementation shown in FIG. 3, a dialog box 320 (e.g., a pop-up window) is displayed to present information related to a performance issue. Dialog box 320 may appear automatically or may appear after a user input, such as when a user presses a touchscreen, a key, or clicks or hovers a mouse, trackball, or other input device on or near problem indicator 115. Dialog box 320 may include a notification about the performance issue, including, for example, an error title, a short description of the error, and options for proceeding, including potential solutions for the error. Examples of options for proceeding may include analyzing the performance issue, reporting the performance issue to server 250, disabling or uninstalling a web browser or web browser application, downloading additional software, or ignoring the performance issue.

As an example, dialog box 320 may state "Slow Browser Error" as the error title. The description of the error may state "NewsExtension is causing delays in your browser—would you like to disable NewsExtension?" Options for proceeding may include "Disable" or "Ignore." a user selects the "Disable" option, a web extension called "NewsExtension" may be disabled. If a user selects "Ignore," dialog box 320 and problem indicator 115 may disappear.

Figure 4:
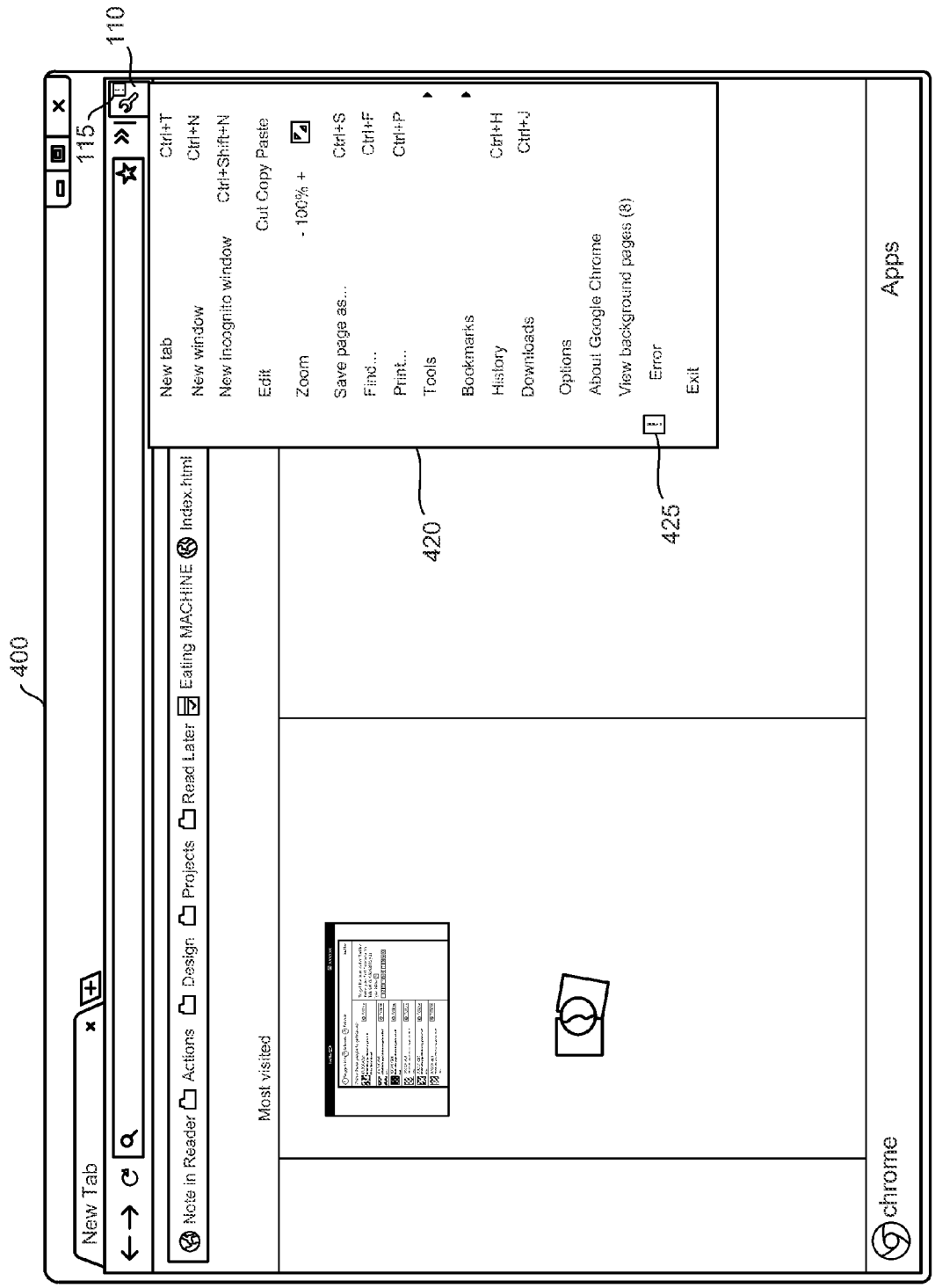
FIG. 4 illustrates another user interface for a web browser.

FIG. 4 illustrates another user interface 400 for a web browser. User interface 400 is an example of another interface that may be used to determine blame and resolve browser performance issues. User interface 400 may include customization indicator 110 and problem indicator 115. In the implementation shown in FIG. 4, if a user selects customization indicator 110 or problem indicator 115, web browser displays menu 420. Menu 420 presents menu options, including an Error option 425. Error option 425 relates to a performance issue. Menu 420 may appear automatically when the performance issue occurs. A selection of Error option 425 may result in various additional options, such as analyzing the problem further, reporting the problem to server 250, disabling or uninstalling a web browser or web browser application, or ignoring the problem, for example.

Figure 5:
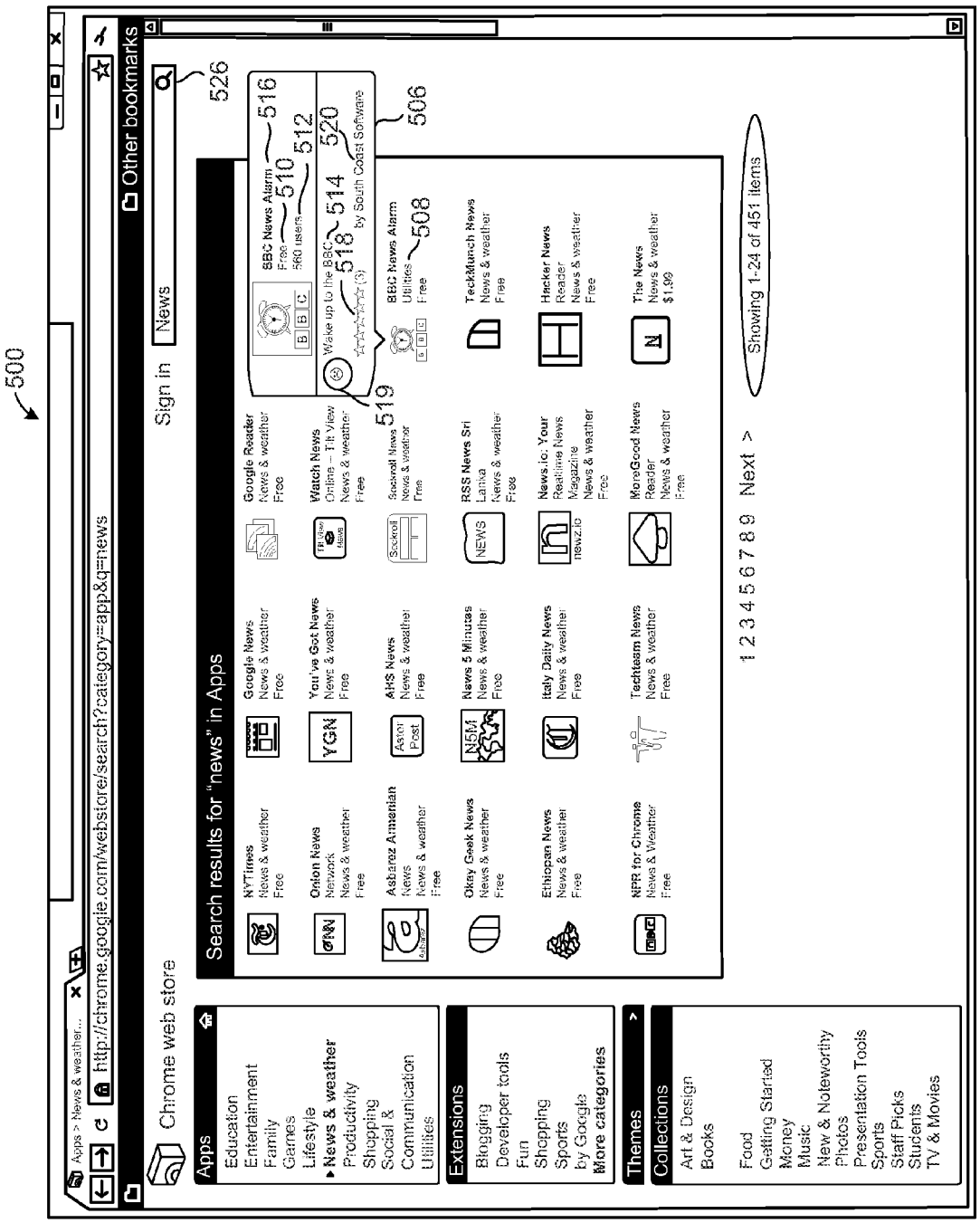
FIG. 5 illustrates a user interface to a marketplace of digital goods.

FIG. 5 illustrates a user interface 500 for a marketplace of digital goods. The user interface is an example of a screen that may be displayed when a user enters a query term "news" in query box 526 to search for web applications available in the marketplace that are related to news. The query term may be compared to metadata associated with digital goods, for example, data stored in digital goods repository 258. Based on the comparison, the query handler 262 may identify one or more digital goods that are related to the query term. The applications that are selected for display in the user interface may be selected based on a ranking of the relative desirability of the identified applications. Furthermore, among the selected subset of applications, the position of the applications within the user interface 500 may be determined by their ranking. For example, applications with higher rankings may be displayed in rows at the top of the user interface 500, and, within a row, applications with a higher ranking may be displayed on the left side of the row.

A pop-up HTML window 506 may be displayed when a user moves a mouse icon over an icon for an application 508 that is displayed in the user interface 500. Within the pop-up HTML window 506, additional information about the web application 508 may be displayed. For example, a field 510 may indicate whether the application is free or the price that must be paid to be able to download and install the app. Another field 512 may indicate how many users have downloaded and/or installed and/or used the application. Information about the installation and/or use of the application on a client device may be transmitted from a browser executing the application of the client device to the marketplace server 250. Another field 514 may display descriptive information about the web application that supplements information in the title field 516. Another field 518 may display an average subjective rating that users have provided of the web application and a number of users that have rated the application.

Another field 519 may display an indicator reflecting a blame score derived from blame engine 263. For example, if application 508 frequently slows down a web browser, field 519 may reflect a low blame score. Alternatively or additionally, the blame score may be incorporated into an overall rating for application 508, such as the rating of field 518. Another field 520 may display the name of the author or developer of the application.

If an application receives a low blame score (e.g., as shown in field 519), developers of web applications and extensions may attempt to fix problems to improve their scores and to attract more users to their products. Therefore, a blame score may operate as an objective quality metric for developers and users (e.g., in the digital marketplace).

Figure 6:
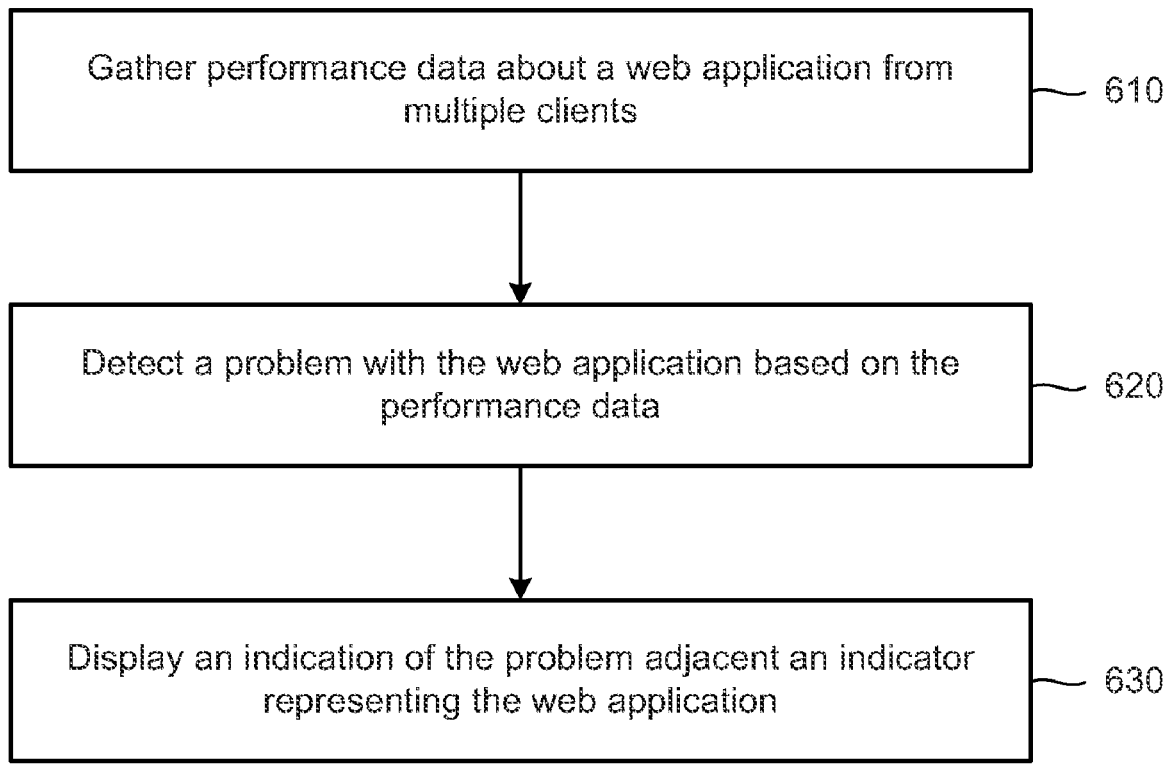
FIG. 6 is a flowchart of an exemplary process for presenting blame about web browser extensions.

FIG. 6 is a flowchart of a process for determining blame for web browser extensions and applications. The flowchart shown in FIG. 6 may be performed at least in part by a marketplace server (e.g., the server 250 shown in FIG. 2). As shown in FIG. 6, performance data about a web application is gathered from multiple clients (e.g., clients 202A, 202B, 202C) (step 610), for example by server 250. By collecting data from multiple clients, a statistical analysis may be performed to understand overall performance issues for the web application. A problem with the web application is detected based on the performance data (step 620), for example by blame engine 263. An indication of the problem (e.g., field 519 shown in FIG. 5) is displayed adjacent an indicator representing the web application (step 630). The indication of the problem may be displayed when the problem is detected, in one example. One skilled in the art will recognize that the process shown in FIG. 6 is an example of one embodiment, and may have steps deleted, reordered, or modified. For example, step 610 may be removed, and a problem with the web application may be determined from performance data that was previously acquired or stored, such as from blame database 260.

Figure 7:
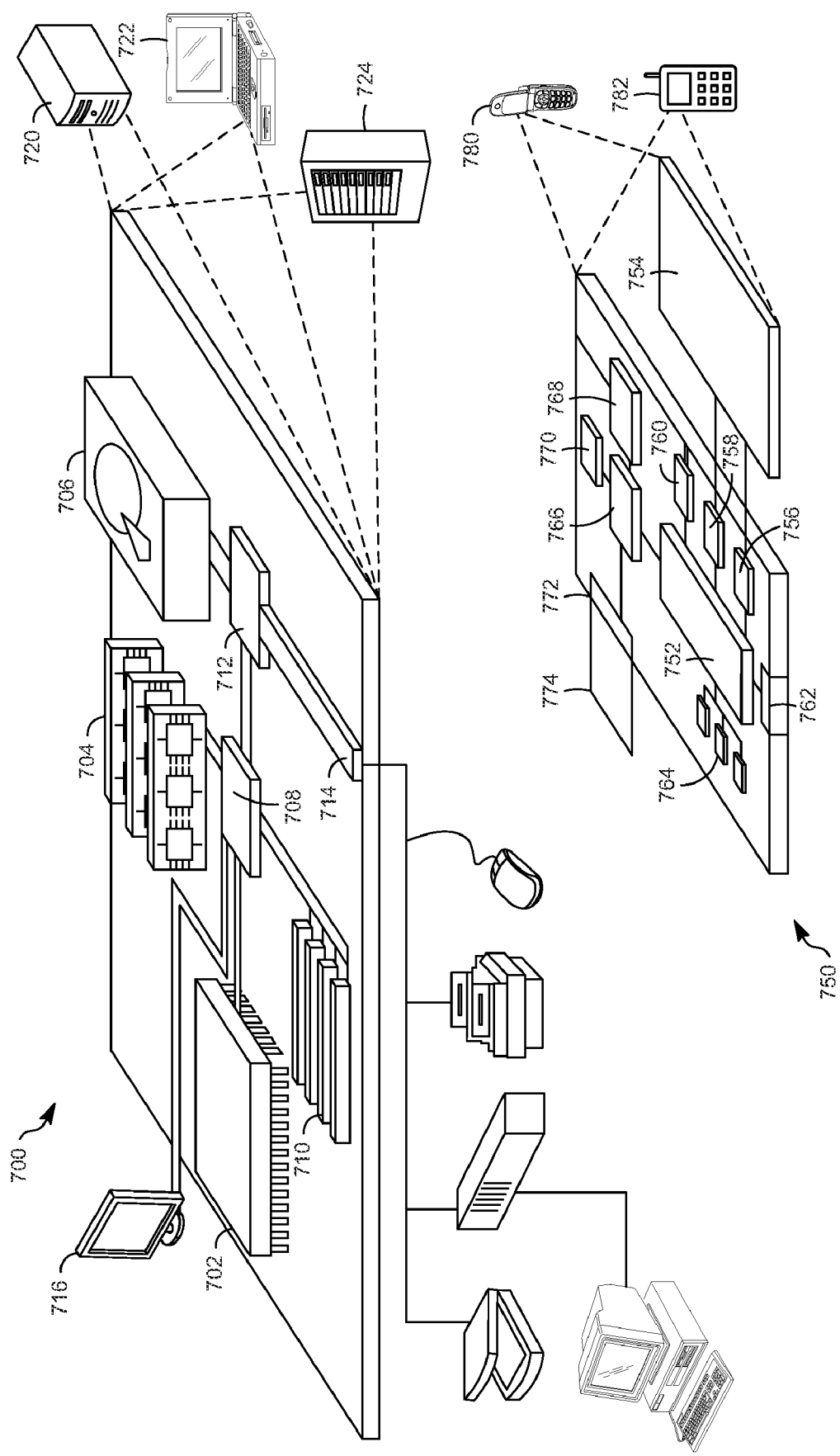
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which my include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for assigning blame to performance of web browser extensions within a web browser, comprising:
   gathering performance data about an installed web browser extension from multiple clients, wherein the performance data is based on multiple performance factors;
   detecting a problem with the web browser extension based on the performance data;
   displaying within the web browser, when the problem is detected, an indication of the problem adjacent an indicator representing the web browser extension;
   applying a performance metric to assign a blame score to the web browser extension; and
   selecting the indication of the problem based on the blame score.

2. The computer-implemented method of claim 1, wherein the detected problem is at least one of a Wi-Fi connection problem, a slow ISP, and a network problem, and wherein the indication represents the detected problem.

3. The computer-implemented method of claim 1, wherein the indication of the problem is displayed in a digital marketplace.

4. The computer-implemented method of claim 1, wherein the performance data is gathered from web browsers that previously executed the web browser extension.

5. The computer-implemented method of claim 1, further comprising:
   receiving a request to analyze the web browser extension.

6. The computer-implemented method of claim 1, wherein the multiple performance factors include: web browser execution time, memory usage, and battery life.

7. A computer-implemented method for determining performance problems for web browser extensions within a web browser, comprising:
   determining a performance issue with a first web browser extension while multiple web browser extensions are installed in and executing on a web browser, wherein the performance issue is determined based on multiple performance factors;
   upon determining the performance issue, displaying within the web browser an indicator representing the performance issue adjacent another indicator representing the first web browser extension;
   applying a performance metric to assign a blame score to the web browser extension; and
   selecting the indication of the problem based on the blame score.

8. The computer-implemented method of claim 7, wherein the determining is based on a database of aggregated web browser extension performance data collected from multiple web browsers.

9. The computer-implemented method of claim 8, wherein the indicator is displayed within one of: a toolbar, a menu, and a pop-up window.

10. The computer-implemented method of claim 8, further comprising:
    reporting the performance issue to clients that have downloaded the first web browser extension.

11. The computer-implemented method of claim 8, wherein the indicator includes a notification with potential solutions to the problem.

12. The computer-implemented method of claim 8, wherein the indicator is displayed in a digital marketplace.

13. The computer-implemented method of claim 8, wherein the indicator is selected based on an analysis of the multiple performance factors.

14. The computer-implemented method of claim 8, wherein the performance issue is unrelated to the first web browser extension.

15. The computer-implemented method of claim 8, wherein the multiple performance factors include: web browser run times, memory usage of a computing device of the client, and battery life of the computing device.

16. The computer-implemented method of claim 8, further comprising:
    comparing the multiple performance factors with a set of analyzed performance factors for a second web browser extension; and
    ranking the first web browser extension and the second web browser extension based on the comparison.

17. The computer-implemented method of claim 8, wherein determining the performance issue includes:
    analyzing information provided by the client.

18. The computer-implemented method of claim 8, further comprising:

reporting the performance issue to clients that have downloaded the first web browser extension.

19. A non-transitory computer-readable storage medium for determining performance problems for web browser extensions installed within a web browser, having recorded and stored thereon instructions that, when executed by a processor of a computer system cause the computer system to:
- gather performance data about a web browser extension, wherein the performance data is based on multiple performance factors;
- detect a problem with the web browser extension based on the performance data;
- display within the web browser, when the problem is detected, an indication of the problem adjacent an indicator representing the web browser extension;
- applying a performance metric to assign a blame score to the web browser extension; and
- selecting the indication of the problem based on the blame score.

20. A system to assign blame to performance of web browser extensions installed within a web browser, comprising:
- a memory configured to store executable code; and
- a processor operably coupled to the memory, the processor configured to execute the code to:
- gather performance data about a web browser extension, wherein the performance data is based on multiple performance factors;
- detect a problem with the web browser extension based on the performance data;
- display within the web browser, when the problem is detected, an indication of the problem adjacent an indicator representing the web browser extension;
- applying a performance metric to assign a blame score to the web browser extension; and
- selecting the indication of the problem based on the blame score.

* * * * *

UNITED STATES PATENT AND TRADEMARK OFFICE
CERTIFICATE OF CORRECTION

PATENT NO. : 8,386,604 B1
APPLICATION NO. : 13/251033
DATED : February 26, 2013
INVENTOR(S) : Erik Kay et al.

It is certified that error appears in the above-identified patent and that said Letters Patent is hereby corrected as shown below:

On the Title Page, Item (56), under "OTHER PUBLICATIONS", in column 2, line 2, delete "/perforrnance/" and insert -- /performance/ --, therefor.

On the Title Page, Item (74), in "Attorney, Agent, or Firm", in column 2, line 1, delete "Highes Bellerman" and insert -- Hughes Bellerman --, therefor.

Signed and Sealed this
Fourth Day of June, 2013

Teresa Stanek Rea
*Acting Director of the United States Patent and Trademark Office*